(12) United States Patent
Kontos et al.

(10) Patent No.: US 9,704,528 B2
(45) Date of Patent: Jul. 11, 2017

(54) APPARATUS AND METHOD FOR IMPROVED PERPENDICULAR RECORDING MEDIUM USING ION IMPLANTATION IN A MAGNETIC FIELD

(71) Applicant: Varian Semiconductor Equipment Associates, Inc., Gloucester, MA (US)

(72) Inventors: Alexander C. Kontos, Beverly, MA (US); Frank Sinclair, Quincy, MA (US); Rajesh Dorai, Woburn, MA (US)

(73) Assignee: Varian Semiconductor Equipment Associates, Inc, Gloucester, MA (US)

( * ) Notice: Subject to any disclaimer, the term of this patent is extended or adjusted under 35 U.S.C. 154(b) by 532 days.

(21) Appl. No.: 13/829,632

(22) Filed: Mar. 14, 2013

(65) Prior Publication Data

US 2014/0272180 A1    Sep. 18, 2014

(51) Int. Cl.
*C23C 16/00*    (2006.01)
*G11B 5/852*    (2006.01)

(52) U.S. Cl.
CPC .................... *G11B 5/852* (2013.01)

(58) Field of Classification Search
CPC ...................................................... G11B 5/852
USPC ...................................................... 118/723 R
See application file for complete search history.

(56) References Cited

U.S. PATENT DOCUMENTS 6,042,707 A * 3/2000 Moslehi .................. C23C 14/22
118/723 FE

OTHER PUBLICATIONS

Chang, G.S., et al., Uniaxial in-plane magnetic anisotropy of CoPt thin induced by ion irradiation, Applied Physics Letters, 2006, pp. 0925504-1 to 092504-3, vol. 88, American Institute of Phyics.
Woods, S.I., et al., Local magnetic anisotropy control in NiFe thin films via ion irradiation, Applied Physics Letters, Aug. 12, 2002, pp. 1267-1269, vol. 81, No. 7, American Institute of Physics.
Mougin, A., et al., Local manipulation and reversal of the exchange bias field by ion irradiation in FeNi/FeMn double layers, Physical Review B, 2001, pp. 060409-1 to 060409-4, vol. 63, The American Physical Society.

* cited by examiner

*Primary Examiner* — Robert S Walters, Jr.

(57) ABSTRACT

In one embodiment, a system for treating a magnetic layer includes an ion source to generate an ion beam containing ions of a desired species. The system may also include a magnetic alignment apparatus downstream of the ion source and proximate to the substrate, wherein the magnetic alignment apparatus is operable to apply a magnetic field to the magnetic layer in the substrate along a direction out of plane relative to the magnetic layer.

12 Claims, 12 Drawing Sheets

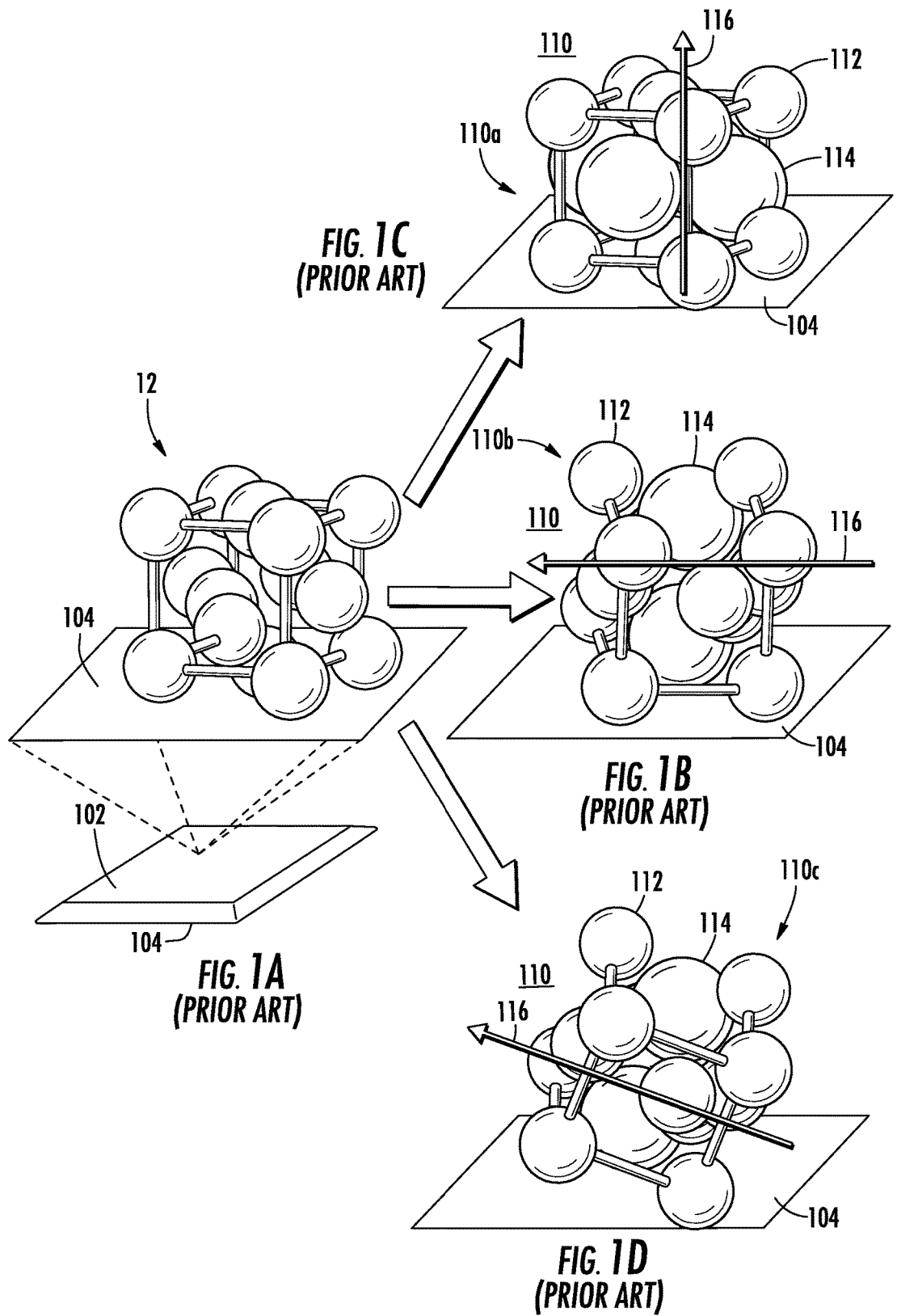

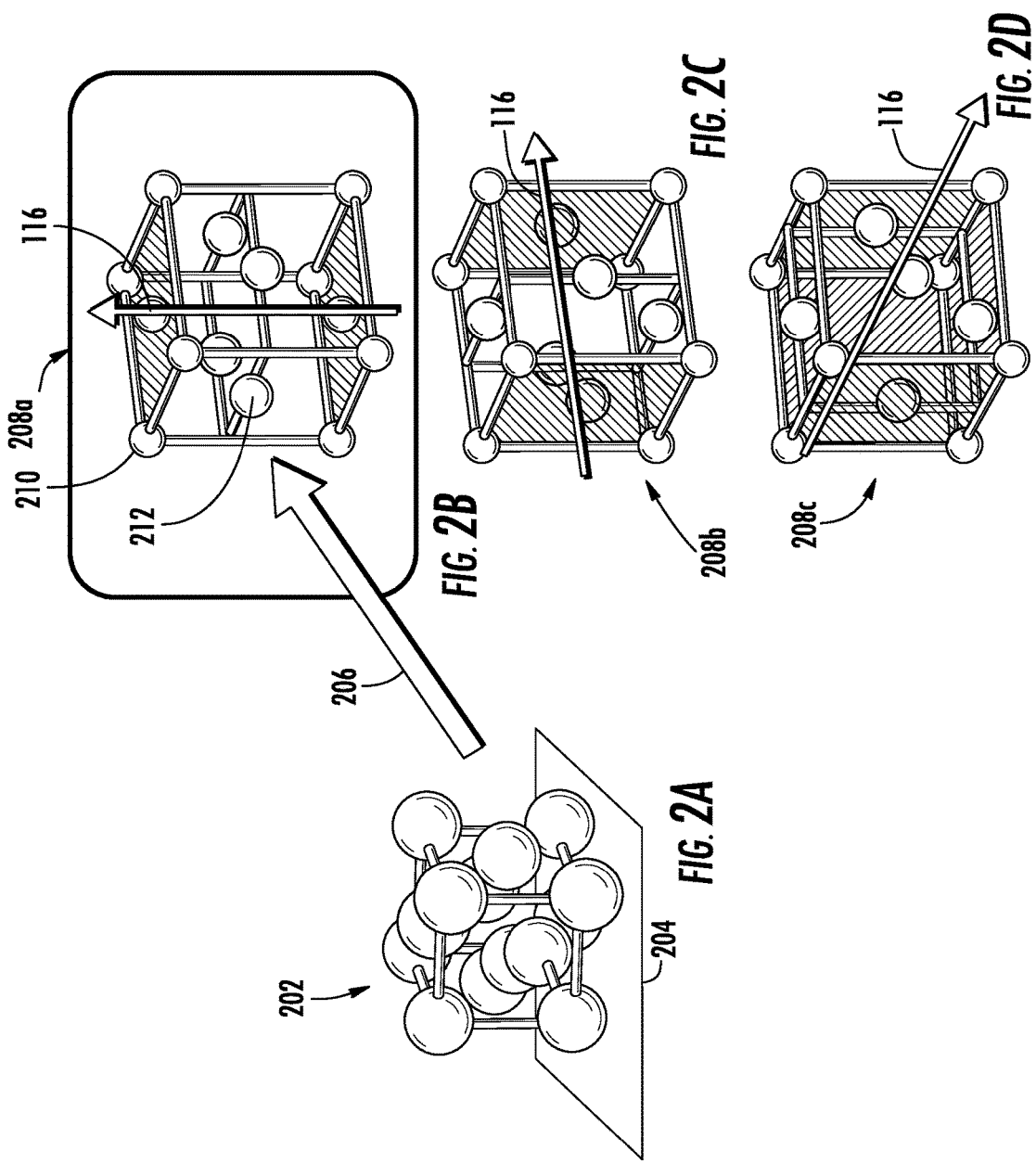

APPARATUS AND METHOD FOR IMPROVED PERPENDICULAR RECORDING MEDIUM USING ION IMPLANTATION IN A MAGNETIC FIELD

FIELD OF INVENTION

This invention relates to magnetic recording and, more particularly, to ion implantation to improve magnetic recording media.

BACKGROUND

It is the goal for many commercial applications to improve the quality of thin magnetic layers that may be used as recording media for various technologies including heat assisted magnetic recording (HAMR) devices, magnetic random access memory (MRAM) and other memory or recording technology. In particular, a central challenge for present day magnetic recording is to increase the storage density in a given magnetic medium/magnetic memory technology. Several features of magnetic materials place challenges on density scaling for magnetic media. For one, memory density may be limited by the grain size of the magnetic layer, which is related to the magnetic domain size and therefore the minimum size for storing a bit of information. Secondly, the ability to read and write data in a magnetic layer is affected by the magnetocrystalline anisotropy of the material. In some cases, it may be desirable to align the easy axis of the magnetic material along a predetermined direction, such as along a perpendicular to the film plane for perpendicular memory applications.

Recently, magnetic alloys, and in particular, CoPt, CoPd, and FePt films have shown promise for high density magnetic storage. In particular, CoPt, CoFe, FePt and related materials form a tetragonal "$L1_0$" phase having high magnetocrystalline anisotropy and exhibiting the ability to form small crystallite (grain) size, both desirable features for high density magnetic storage. The $L1_0$ phase is believed to be the thermodynamically stable phase at room temperature for materials such as CoPt. However, when thin layers are prepared under typical conditions, such as being deposited by physical vapor deposition on unheated substrates, the face centered cubic (FCC) A1 phase is typically found. Preparation of the "$L1_0$" phase typically involves high temperature deposition of a thin film such as CoPt and/or high temperature post-deposition annealing, both of which may impact the ability to achieve the desired magnetic properties, and which may deleteriously affect other components of a magnetic device that are not designed for high temperature processing. Similarly, in the case of FePt films deposited at room temperature, the initial film structure is a disordered alloy A1 structure that requires annealing at about 500-600° C. to yield the ordered $L1_0$ face-centered-tetragonal (FCT) structure. Upon annealing, the grain size of such films may exceed desired limits for high density storage.

Recently, ion implantation of FePt was observed to reduce the amount of post deposition heat treatment required to form the $L1_0$ phase. By reducing the amount of thermal treatment required to form the desired $L1_0$ phase, the grain size may be maintained at a smaller level, thereby potentially increasing the storage density of magnetic media formed by such a process. However, for perpendicular magnetic data recording using materials such as $L1_0$ FePt, it is desirable to align the easy axis of the FCT phase along a desired direction to allow convenient reading and writing of data.

In this regard, conventional approaches suffer in that the microstructure of such $L1_0$ structures is less than ideal for high density storage. FIGS. 1a-1d depict an example of problems with the conventional approaches for forming the $L1_0$ phase. The coating material 102 is illustrated as deposited on a substrate 104, which may be any appropriate substrate. It is to be emphasized that the relative thickness of layers is not necessarily drawn to scale. For high density storage materials, such as perpendicular recording media, the layer thickness of such a coating material 102 may be below 100 nm and is some cases as thin as about 10 nm or less. Coatings may be deposited by vacuum deposition methods such as physical vapor deposition (PVD) as noted. As deposited, the coating material 102 is shown as having an FCC crystal structure in the close up view of FIG. 1a. In the FCC structure (also termed A1) for FePt, an iron atom may occupy any site of the FCC lattice as is also the case for platinum. The atoms of the material 102 are therefore represented by the same appearance. As noted, in prior art approaches, the use of heat treatment at temperatures in excess of 300° C. and typically in the range of 500-700° C. may result in the formation of the FCT phase as illustrated in FIGS. 1b to 1d. In particular, the coating material 102 is transformed into the coating material 110, which has the same overall composition as the coating material 102, such as FePt. However, the FCT phase is an ordered structure in which each Fe atom resides on a first set of lattice sites, while each Pt atom resides on a second set of lattice sites, such that the Pt atoms 112 arrange in planes of like atoms that are interleaved with planes of Fe atoms 114, as shown. In this $L1_0$ structure, the easy direction 116 of magnetization lies along the "c" axis of the FCT structure.

Although ion treatment may reduce the heat treatment or temperature of formation of the FCT phase having the $L1_0$ structure, in general, crystallites of FePt or other magnetic materials having the FCT $L1_0$ structure may assume any of multiple orientations after formation of the FCT phase. FIGS. 1b to 1d provide examples of different orientations that may be assumed by crystallites within a coating. The coating material of FIG. 1b, which is also denoted as coating material 110a to indicate a particular crystalline orientation, may represent one or more FCT crystallites formed from the coating material 102 having the FCC phase. As shown, coating material 110a exhibits an orientation in which the easy direction 116 is oriented perpendicular to the plane of the substrate 104, which is desirable for perpendicular storage applications. The coating material 110b of FIG. 1c exhibits an easy direction 116 that lies parallel to the plane of the substrate 104, which is less desirable for perpendicular storage. Finally, the coating material 110c of FIG. 2d has an easy direction 116 that forms a non-zero angle with respect to the plane of substrate 104, which is also less desirable for perpendicular storage.

Heretofore, apparatus and techniques are lacking to produce a microstructure in which the easy direction 116 of the $L1_0$ FePt is aligned along a perpendicular to the film, and in particular to perform such treatment at low temperature. Although the use of crystalline substrates such as MgO to promote epitaxial growth may be helpful, such approaches limit the flexibility of substrates for synthesizing magnetic layers and in any case may not result in formation of $L1_0$ FePt having the degree of easy axis alignment desired. Moreover, although magnetic fields have been applied to coatings, these fields are arranged within the plane of the substrate and are not well suited for aligning the easy axis perpendicular to the plane of the substrate. What is needed is an improved method and apparatus of forming perpendicular magnetic recording layers and devices.

SUMMARY

This Summary is provided to introduce a selection of concepts in a simplified form that are further described below in the Detailed Description, and is not intended to identify key features or essential features of the claimed subject matter, nor is it intended as an aid in determining the scope of the claimed subject matter.

In one embodiment, a system for treating a magnetic layer is provided that includes an ion source to generate an ion beam containing ions of desired species. The system further includes magnetic alignment apparatus downstream of the ion source and proximate to the substrate, the magnetic alignment apparatus operable to apply a magnetic field to the magnetic layer in the substrate along a direction out of plane relative to the magnetic layer.

In a further embodiment, a method for treating a magnetic layer includes arranging a substrate that includes the magnetic layer, providing in a region proximate the magnetic layer a magnetic field in a direction out of plane relative to the magnetic layer, and exposing the magnetic layer of the substrate to ions directed toward the substrate along a direction parallel to the magnetic field in the region proximate the magnetic layer.

BRIEF DESCRIPTION OF THE DRAWINGS

FIGS. 1a-1d depict the results of conventional processing for a magnetic material;

FIGS. 2a-2d depict an example of results for treating magnetic material according to the present embodiments;

FIG. 5a depicts one component of the system of FIG. 4a;

FIG. 7b depicts results of magnetic field simulation of the apparatus of FIG. 7a;

FIGS. 8a-8c depict further results of magnetic field simulation of the apparatus of FIG. 7a;

FIG. 9 depicts results of simulation of ion trajectories in the presence of the apparatus of FIG. 7a;

DETAILED DESCRIPTION

Figure 3A:
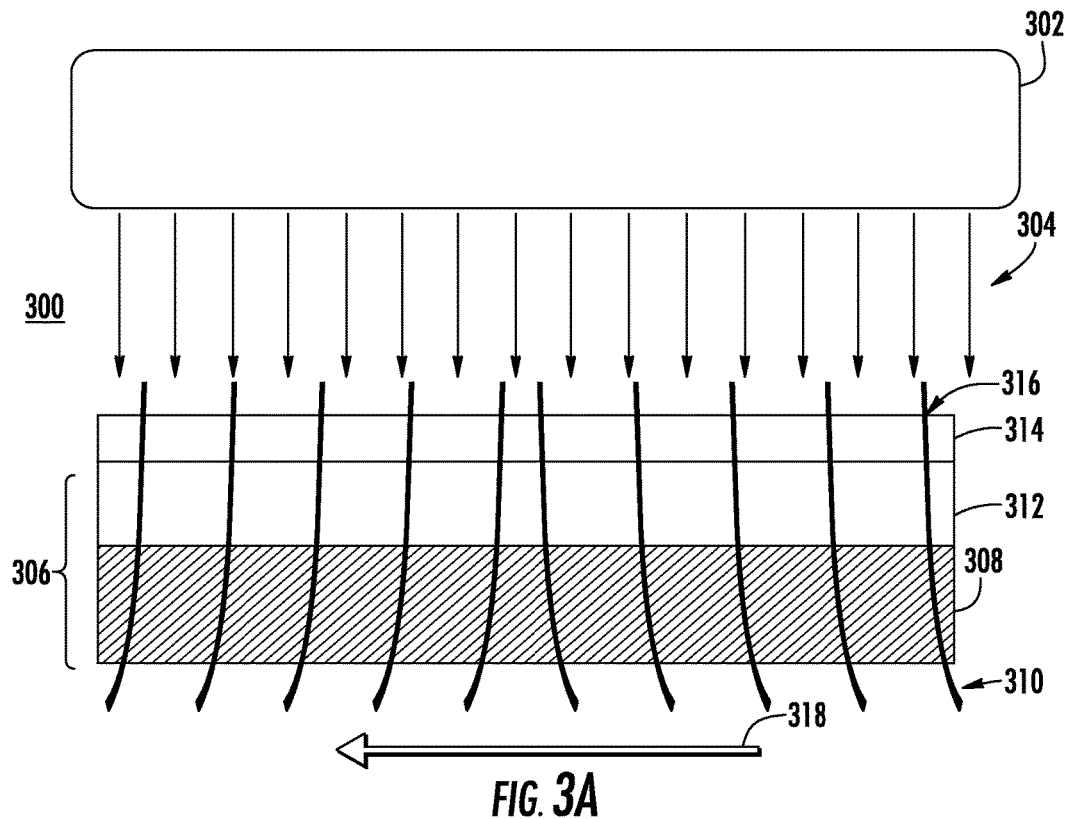
FIG. 3a depicts an embodiment of a system for treating a magnetic layer.

The embodiments described herein provide apparatus and methods for treating magnetic media, such as magnetic layers (also termed "films") that form part of a recording or storage device. In particular, embodiments are directed to providing improved perpendicular magnetic storage devices including high density heat assisted magnetic recording HAMR storage, MRAM, and other devices. The present embodiments provide a novel combination of the application of magnetic fields and ion treatment to align the microstructure of a magnetic layer along a desired direction. In particular variants, the present embodiments may be used to align a magnetic material having a strong magnetocrystalline anisotropy to provide alignment of the easy axis of the material along a desired direction. Examples of such materials include iron compounds having the face centered tetragonal $L1_0$ structure including FePt and CoPt (although $L1_0$ structure is an example of a face centered tetragonal structure, the terms $L1_0$ and FCT are used herein generally interchangeably or in combination to refer to a magnetic alloy having the $L1_0$ structure).

As noted, the FePt $L1_0$ structure represents an ordered phase as compared to an FCC variant of the same composition (FePt) in which the atoms of Fe and Pt are randomly distributed at any lattice site of the FCC structure. The $L1_0$ phase is particularly favored for high density perpendicular magnetic storage applications because of its high magnetocrystalline anisotropy and its ability to form small grains. Consistent with the present embodiments apparatus and methods are provided to produce a highly oriented magnetic layer in which the easy axis (also termed herein "easy direction") of magnetization is oriented perpendicular to the plane of the substrate and film that constitutes the magnetic storage medium.

FIGS. 2a-2d depict one example of operation of the present embodiments. FIG. 2a depicts an example of using the coating material 202 as a precursor to a final coating having a desired microstructure for perpendicular magnetic storage. The coating material 202 may be a magnetic material that is deposited on a substrate 204, which may be any desired structure including an electronic circuit such as an MRAM device structure. As illustrated the coating material exhibits the FCC structure as described above for coating material 102, which is often the case for FePt, CoPt, FePd and similar materials when deposited at room temperature. Consistent with the present embodiments, treatment 206 may be provided to the coating material 202, which constitutes a combination of magnetic field and ion beam exposure. The treatment 206 results in the formation of a desired microstructure represented by the coating 208a of FIG. 2b. As shown in FIG. 2b, one unit cell of a crystallite having the aforementioned $L1_0$ structure is oriented such that the easy direction 116 is perpendicular to the plane of substrate 204 (shown only in FIG. 2a for clarity but having the same orientation in the FIGS. 2a-2d). The c-axis of the FCT phase is thus oriented perpendicular to the plane of the substrate 204 such that layers of atoms 210, which may be iron or cobalt in some examples, are interleaved with layers of atoms 212, which may be platinum, or alternatively palladium, in other examples. The embodiments are not limited in this context. As described in more detail below, this orientation may be imparted into multiple small crystallites of the FCT phase such that the overall coating 208a has superior magnetic properties, especially for the purposes of high density perpendicular magnetic storage. FIGS. 2c and 2d depict two (among many) additional possible coating microstructures 208b and 208c, respectively, in which the easy direction 116 is oriented in different directions but parallel to the plane of the substrate 204. As also described below, the presence of these and other orientations may be reduced by use of the apparatus and techniques of the present embodiments, resulting in layers having a higher degree of the microstructure represented by the coating 208a of FIG. 2b.

In various embodiments, a system for treating magnetic layers includes a component to generate an ion beam to treat the magnetic layer and a component to generate a magnetic field to provide magnetic alignment to the layer, which may occur during exposure to the ion beam. In particular embodiments, the system may also include heating devices to provide heat treatment to the magnetic layers during exposure to the ion beam and magnetic field. The exposure to the ion beam may be particularly effective in reducing the amount of heat treatment, if any, to be applied to a magnetic material in order to induce a desired microstructure, such as the $L1_0$ structure for FePt, CoPt, FePd, and similar materials. The exposure of the magnetic layer to the magnetic field provided by apparatus of the present embodiments may be particularly effective in aligning crystallites of the magnetic material such that the easy axis is oriented perpendicularly to the plane of the film.

FIG. 3a depicts a system 300 for treating a magnetic layer consistent with another embodiment. In the present embodiment, the system 300 includes an ion generating apparatus 302. In some embodiments, the ion generating apparatus 302 may optionally include ion implantation components such as a magnetic analyzer, electrostatic lenses (all not shown), scanner, collimating lens, ion energy filter, and the like, which may control the ions generated from the ion source as an ion beam 304 and direct the ion beam 304 toward the substrate 314. Such components may orient the ion beam 304 relative to the substrate at a desired angle, control the ions in the ion beam 304 such that the ions are substantially parallel to one another, control the ion beam 304 such that the ions in the ion beam 304 may be uniform in energy. In other embodiments the ions may be directed toward the substrate as a bias or potential is applied to the substrate 314 to attract the ions generated from the ion source. For example, a potential may be applied to the substrate via a magnetic alignment apparatus 306, including components therein, so as to bias the substrate 314 to a desired voltage level with respect to the ions to attract ions of the appropriate energy generated in an ion source to impinge on a magnetic layer of the substrate. In various embodiments, the ion generating apparatus 402 may generate ions that are effective in inducing defects in a magnetic layer so as to accelerate a transformation from a disordered to an ordered structure, such as a transformation of an FCC FePt, FePd, or CoPt material, to name a few examples, into an $L1_0$ (FCT) structure. In some instances, the ions of ion beam 304 maybe ions of inert species including hydrogen (H), or nitrogen (N). The ions of inert species may also include noble species such as helium (He), neon (Ne), argon (Ar), or krypton (Kr), or xenon (Xe). In particular, light ions such as helium and hydrogen may be especially effective in introducing mobile vacancies into the magnetic material to facilitate phase transformation from the FCC to FCT phase. The embodiments are not limited in this context.

In some examples, helium ions are provided in the ion beam 404 at an ion energy of about 5 keV to about 50 keV.

The ion energy used to effect the transformation from FCC to FCT phase may be increased with increases in film thickness as is known. Exemplary ion doses effective for transforming an FCC layer into an FCT layer may range from about 1E13 to 1E15 for layer thicknesses of magnetic layers less than about 50 nm. The embodiments are not limited in this context.

As illustrated in FIG. 3a, the magnetic alignment apparatus 306 of the present embodiment, whose components are shown in a side cross-sectional view, includes a magnet 308, which is operative to generate a magnetic field 310. In various embodiments, the magnet 308 may be a permanent magnet or an electromagnet. In some embodiments, the magnetic alignment apparatus may include a magnetic field provider 312 disposed between the magnet 308 and substrate 314. The magnetic field provider 312 may act to provide the magnetic field 310 generated by the magnet 308 to regions proximate substrate 314. In particular, the magnetic field provider 312 may act to provide magnetic field lines of the magnetic field 310 that are oriented out of plane in regions proximate the substrate 314. The term "out of plane" as used herein, refers to a direction or set of directions that is not parallel to a surface of the substrate 316, as represented by the "in-plane" direction 318. For example, in some instances an out of plane orientation of filed lines may constitute field lines that form an angle of greater than fifteen degrees with respect to the direction 318.

By arranging the out of plane orientation of field lines of a magnetic field, the magnetic alignment apparatus 306 may facilitate the ability to orient the easy axis of a magnetically anisotropic layer along a desired direction. In some embodiments, the magnet 308 and magnetic field provider 312 may be interoperative to provide magnetic field lines of the magnetic field 310 that are generally perpendicular to the surface 316, as suggested in FIG. 3a. In addition, by arranging the orientation of field lines of a magnetic field along a specific out of plane direction, the coupling of the magnetic field to incident ions can be minimized. For example, in embodiments in which the magnetic field lines of magnetic field 310 are oriented perpendicularly to the surface 316, the ions of the ion beam 304 may simultaneously be directed perpendicularly to the surface 316 when striking the substrate 314. By providing a magnetic field 310 whose field lines are oriented generally parallel to ion of the ion beam 304, the present embodiments facilitate novel processing of magnetic material disposed on the substrate 314. In particular the system 300 and variants thereof discussed below provide the ability to simultaneously form a highly magnetically anisotropic structure, such as the face centered tetragonal $L1_0$ structure, and to the easy axis of such a structure perpendicularly to the surface 316 of the substrate 314. At the same time, the perturbation of ions of the ion beam 304 may be minimized when the ions are directed perpendicularly to the surface 316, that is, parallel to the magnetic field lines of the magnetic field 310.

In various embodiments, the magnetic field provider 312 may also act as a support structure such as a substrate holder in some instances. Although not explicitly shown, the magnetic field provider 312 may be translatable, tiltable, and/or rotatable with respect to the ion beam 304.

Figure 3B:
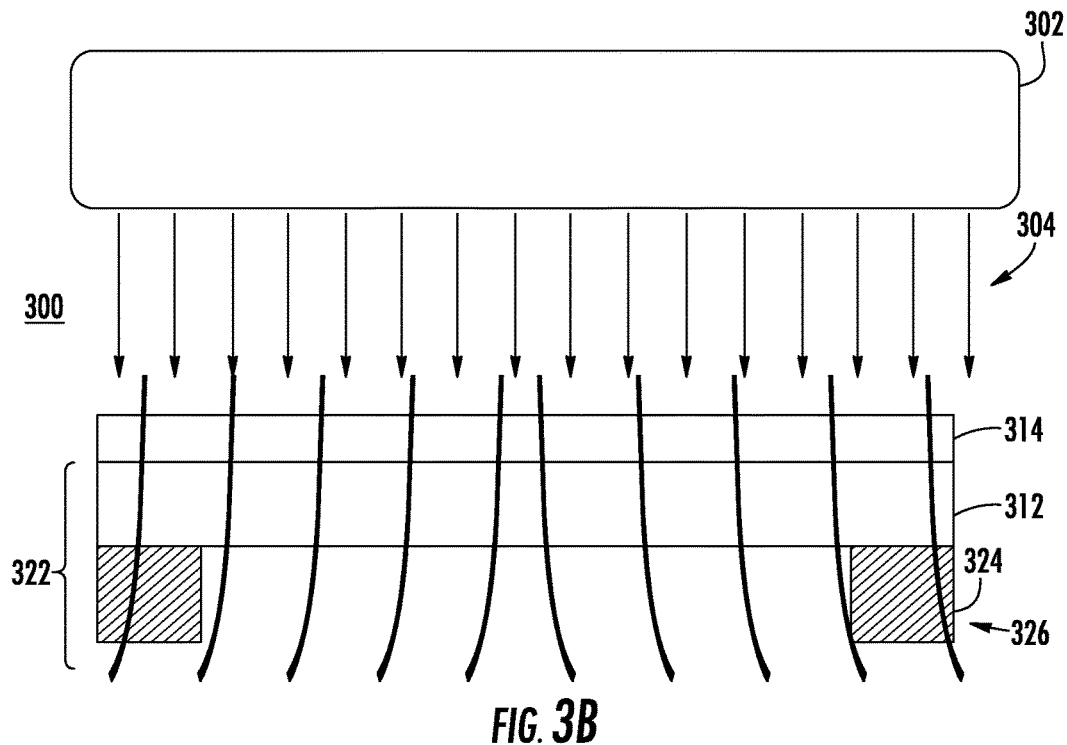
FIG. 3b depicts another embodiment of a system for treating a magnetic layer.

FIG. 3b depicts a system 320, which is a variant of the system 300 of FIG. 3a. The system 320 includes a magnetic alignment apparatus 322 that includes the support structure 312 and an electromagnet 324. The electromagnet 324 may be configured in a coil structure that is operative to generate a magnetic field 326 whose filed lines are oriented similarly to those of magnetic field 310 of the system 300.

Figure 4A:
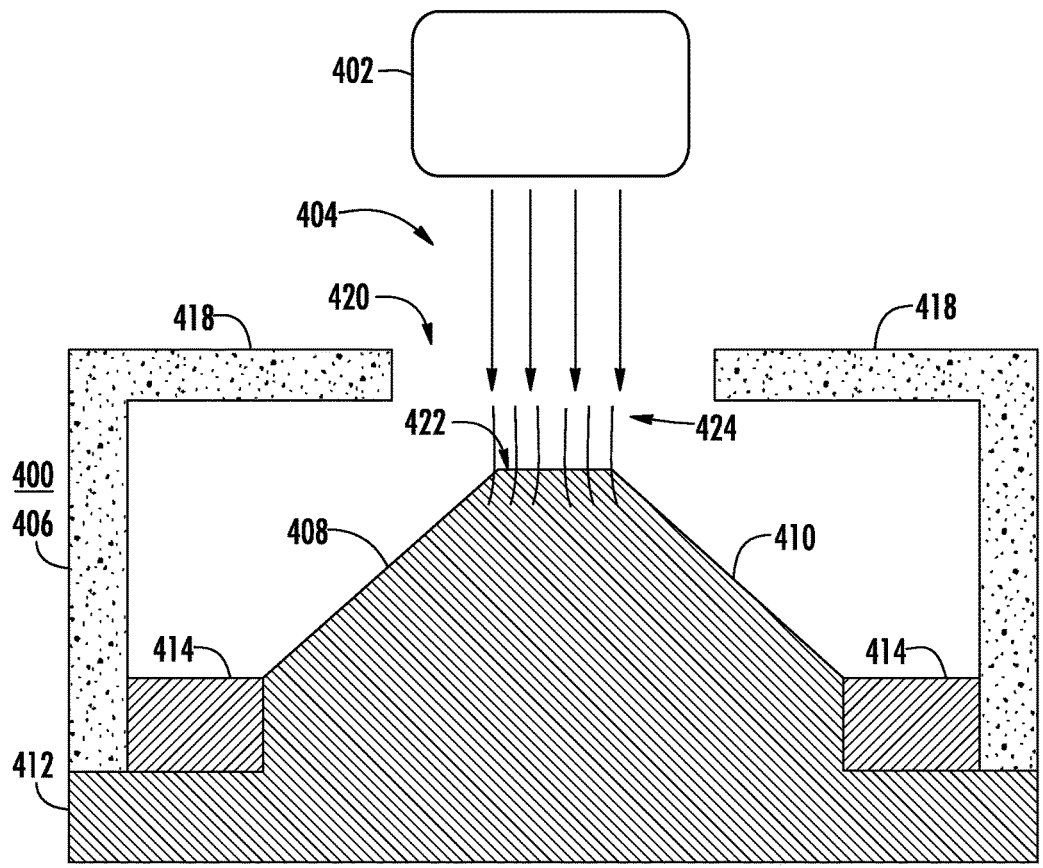
FIG. 4a depicts a further embodiment of a system for treating a magnetic layer.

FIG. 4a depicts a system for treating a magnetic layer consistent with another embodiment. In the present embodiment, the system 400 includes an ion generating apparatus 402, which may include an ion source for generating ions of desired species and a magnetic alignment apparatus 406. In some embodiments, the magnetic alignment apparatus 406 may form part of an ion implantation system. In some embodiments, the ion generating apparatus 402 may optionally include ion implantation components such as a magnetic analyzer, electrostatic lenses (all not shown), scanner, collimating lens, ion energy filter, and the like, which may control the ions generated from the ion source as an ion beam 404 and direct the ion beam 404 toward a substrate. Such components may orient the ion beam 404 relative to the substrate at a desired angle, control the ions in the ion beam 404 such that the ions are substantially parallel to one another, control the ion beam 404 such that the ions in the ion beam 404 may be uniform in energy. In other embodiments the ions may be directed toward the substrate as a bias or potential is applied to the substrate to attract the ions generated from the ion source. For example, a potential may be applied to the substrate via the magnetic alignment apparatus 406, including components therein, so as to bias a substrate to a desired voltage level with respect to the ions to attract ions of the appropriate energy generated in an ion source to impinge on a magnetic layer of the substrate. In various embodiments, the ion generating apparatus 402 may generate ions that are effective in inducing defects in a magnetic layer so as to accelerate a transformation from a disordered to an ordered structure, such as a transformation of an FCC FePt, FePd, or CoPt material, to name a few examples, into an $L1_0$ (FCT) structure. In some instances, the ions of ion beam 404 maybe ions of inert species including hydrogen (H), or nitrogen (N). The ions of inert species may also include noble species such as helium (He), neon (Ne), argon (Ar), or krypton (Kr), or xenon (Xe). In particular, light ions such as helium and hydrogen may be especially effective in introducing mobile vacancies into the magnetic material to facilitate phase transformation from the FCC to FCT phase. The embodiments are not limited in this context.

In some examples, helium ions are provided in the ion beam 404 at an ion energy of about 5 keV to about 50 keV. The ion energy used to effect the transformation from FCC to FCT phase may be increased with increases in film thickness as is known. Exemplary ion doses effective for transforming an FCC layer into an FCT layer may range from about 1E13 to 1E15 for layer thicknesses of magnetic layers less than about 50 nm. The embodiments are not limited in this context.

As illustrated in FIG. 4a, the magnetic alignment apparatus 406 of the present embodiment, whose components are shown in a side cross-sectional view, may preferably include a magnetic concentrator 408 that supports a magnetic coil 414 and return yoke 418. As detailed below, the magnetic concentrator 408 magnetic coil 414 and return yoke 418 are operative to provide a highly directional, for example unidirectional, and high strength magnetic field (e.g. >0.1 T) in a substrate location, such that a substrate and magnetic layer may be exposed to a magnetic field that lies perpendicular to the substrate plane while simultaneously receiving exposure to the ion beam 404. The magnetic concentrator 408 of the present embodiment may have a tapered shape, which may be conical in various embodiments. As illustrated, an upper portion 410 of the magnetic field provider 408 may taper inwardly so that an upper surface 422 has a smaller area than that of a base portion 412. As detailed below, the upper surface 422 may act as a support structure such as a substrate holder for substrates to be treated by the system 400.

In the present embodiments, the magnetic concentrator 408 may be a steel material that acts to place a strong magnetic field in a region that includes the upper surface 422. As further shown in FIG. 4a, the magnetic coil 414 may be disposed near the upper portion 410 of the magnetic concentrator 408 that is adjacent the base portion 412. In various embodiments, the magnetic coil 414 may be a permanent magnet, while in other embodiments, the magnetic coil may be an electromagnet. As shown in FIG. 4a, the magnetic alignment apparatus 406 is operative such that the magnetic field 424 produced by the magnetic coil 414 is perpendicular to the upper surface 422 of the magnetic concentrator 408 at the point where the magnetic field 424 passes through the upper surface 422. Other portions of the magnetic field (not shown for clarity, may then bend outwardly and downwardly through the return yoke 418 and into the magnetic coil 414.

As additionally shown in FIG. 4a, the return yoke 418 includes an aperture 420 that is aligned over the upper surface 422 of the magnetic concentrator such all portions of the upper surface 422 may be exposed to a perpendicular ion beam without obstruction. In this manner, a magnetic layer formed on a substrate that is placed in the magnetic alignment apparatus 406 may receive simultaneous treatment with the ion beam 404 while subject to the effect of the magnetic field 424, both of which may be directed perpendicularly to the upper surface 422.

In various embodiments, the magnetic alignment apparatus 406 is movable with respect to the ion beam 404. For example, the magnetic alignment apparatus 406 may be coupled to components (not shown) that provide, with respect to the ion beam 404, a translation motion, a tilt motion, and/or a rotation motion, or any combination of the above.

In various embodiments, the magnetic alignment apparatus 406 and ion generating apparatus 402 may define a process region in which an out of plane magnetic field and ion beam overlap. For example, the ion generating apparatus 402 may generate a spot beam that overlaps a magnetic field generated by the magnetic alignment apparatus 406 in a spot shaped region. Alternatively, the ion generating apparatus 402 may generate a ribbon beam that overlaps a magnetic field generated by the magnetic alignment apparatus 406 in an elongated region.

Figure 4B:
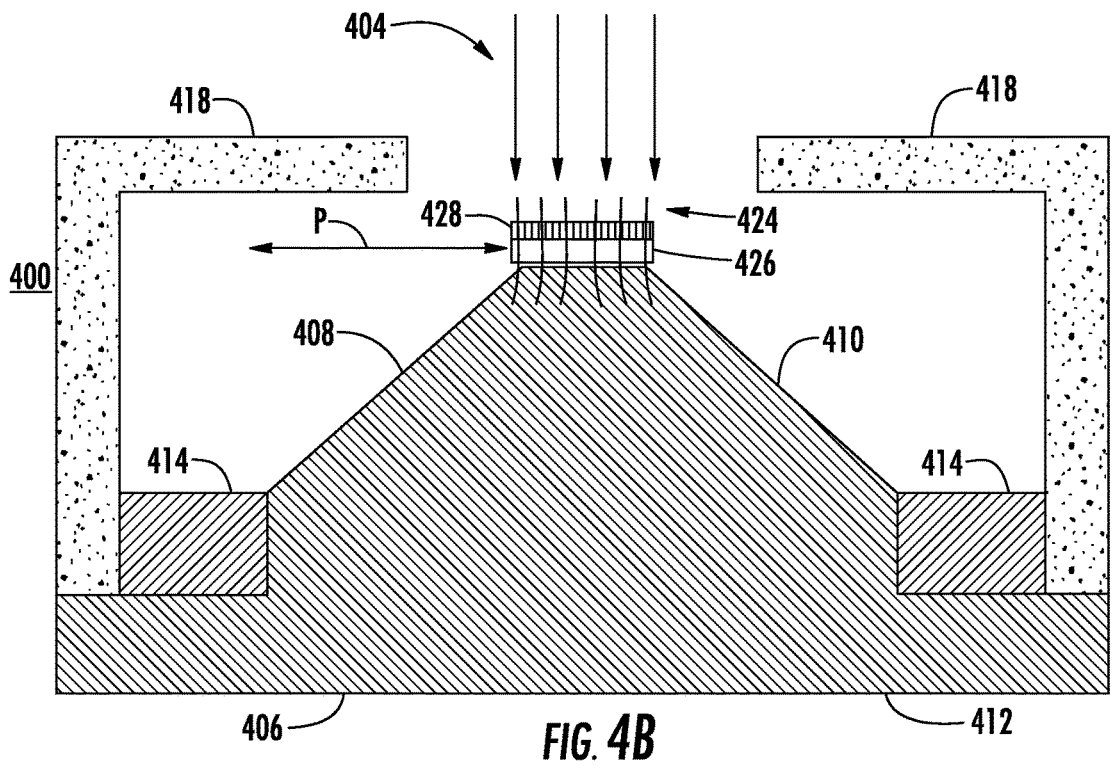
FIG. 4b depicts a scenario for use of the system of FIG. 4a with a substrate and magnetic layer in place.

FIG. 4b depicts one instance in which a substrate 426 is placed on the upper surface 422. The substrate 426 includes a magnetic layer 428 which may be exposed to the ion beam 404 during ion implantation. In various embodiments in which the magnetic layer 428 is a material such as a FePt, FePd, CoPt, or similar alloy, the system 400 may treat the layer 428 in the following manner. As previously noted, the magnetic layer 428 may initially be deposited on the substrate 426 while the substrate 426 is unheated or at a relatively low substrate temperature, such as below 300° C. The deposition of magnetic layer 428 at low substrate temperature may be necessary or desirable based on constraints due to other components or materials that may be present on the substrate 426. For example, in embodiments in which the substrate 426 is used to fabricate MRAM devices, various structures of an MRAM integrated circuit may be present at the time the magnetic layer 428 is deposited, at least some of which structures may be deleteriously affected by a high substrate temperature, such as temperatures in the range of 500-700° C. that are typically necessary to transform the FCC magnetic layer into the FCT structure in the absence of ion bombardment. Accordingly, as deposited, the magnetic layer 428 may form in the FCC structure for alloys such as FePt, FePd or CoPt.

In embodiments in which the magnetic layer 428 is an FCC alloy of FePt, FePd, CoPt or other material, the substrate 426 together with the layer magnetic 428 may be placed as shown in FIG. 4b for treatment on the upper surface 422 of the magnetic alignment apparatus 406. Subsequently, an ion beam 404 is directed toward the substrate 426 in a direction generally perpendicular to the plane of the substrate 426, which plane is represented in cross-section by the line P. In various embodiments, the magnetic layer 428 is disposed at the surface of the substrate 426 when subjected to the ion beam 404. Alternatively, one or more layers may be disposed between the magnetic layer 428 and ion beam 404. In either case, the ion energy and ion dose are arranged so as to implant ions within the magnetic layer 428. As is known, upon striking the magnetic layer 428, the ions may create vacancies or other defects that assist in migration of atoms such as Fe and Pt in the case of FePt. The migration may be on a short length scale such that atoms of one species, such as Fe, order on one lattice site, while atoms of another species, such as Pt, order on a different lattice site so as to form the $L1_0$ structure. Since the atoms of the FCC phase may be intimately and randomly mixed on the FCC lattice at the atomic scale, formation of the FCT structure $L1_0$ may generally require atomic migration on the length scale of nanometers or less. Thus in some embodiments, the substrate 426 may require no heating or may be heated to temperatures of about 300° C. or less.

Because the magnetic field 424 is also aligned perpendicularly to the plane P at the level of the magnetic layer 428 as shown, crystallites of the FCT FePt material or CoPt material may tend to align with their c-axes parallel to the field lines of the magnetic field 424. In other words, the c-axis of the $L1_0$ structure, which represents the easy direction of magnetization, may also align perpendicularly to the plane P, as is desired for perpendicular reading and writing to devices. Moreover, because treatment may take place at relatively low substrate temperatures (</=300° C.), the crystallite size of the FCT $L1_0$ layer thus formed may remain small, which is desirable for high density storage.

Figure 5A:
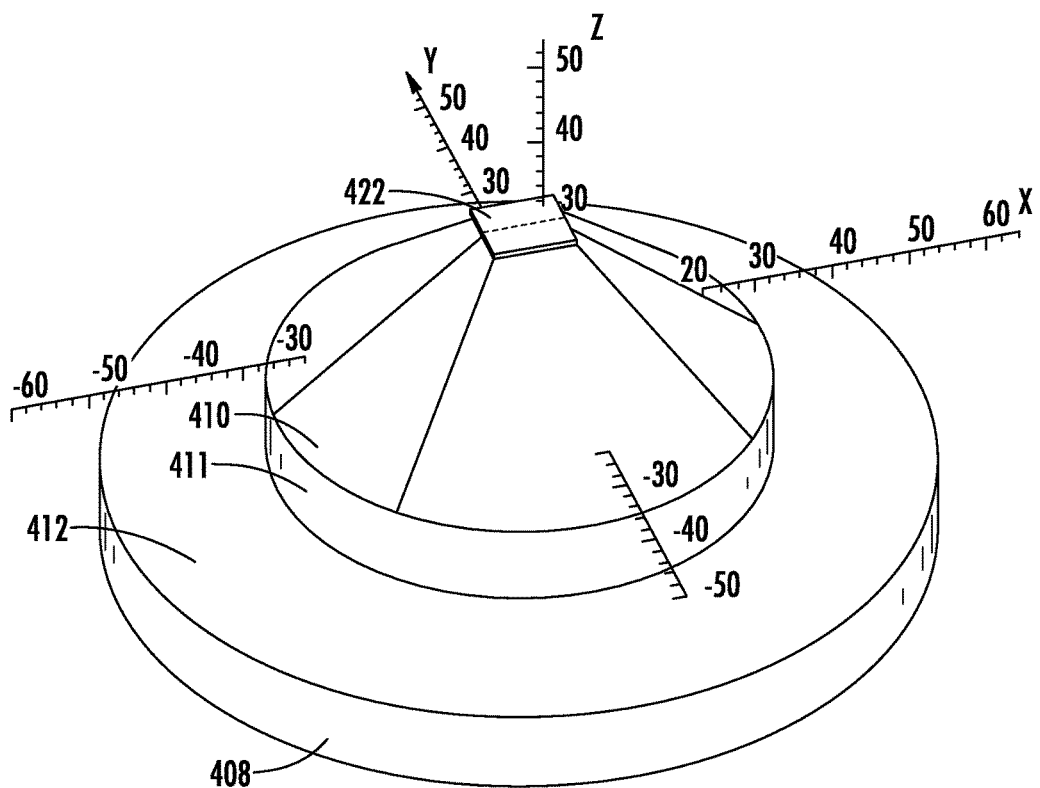

FIGS. 5a-6b provide further details of components of one variant of the magnetic alignment apparatus 406. FIG. 5a depicts a top perspective view of the magnetic concentrator 408. As noted previously, the magnetic concentrator 408 may be formed using a steel material. In some cases the magnetic concentrator 408 may be formed from a single monolithic piece of steel. As illustrated, the upper portion 410 of the magnetic concentrator 408 has a generally conical shape, although the region 411 of the upper portion 410 that is adjacent the base portion 412 has a sidewall that is perpendicular to the base portion 412. The upper surface 422 of the magnetic concentrator 408 is illustrated as being rectangular or square in shape, although in other embodiments the upper surface 422 may be circular or have any convenient shape to support a substrate.

Figure 5B:
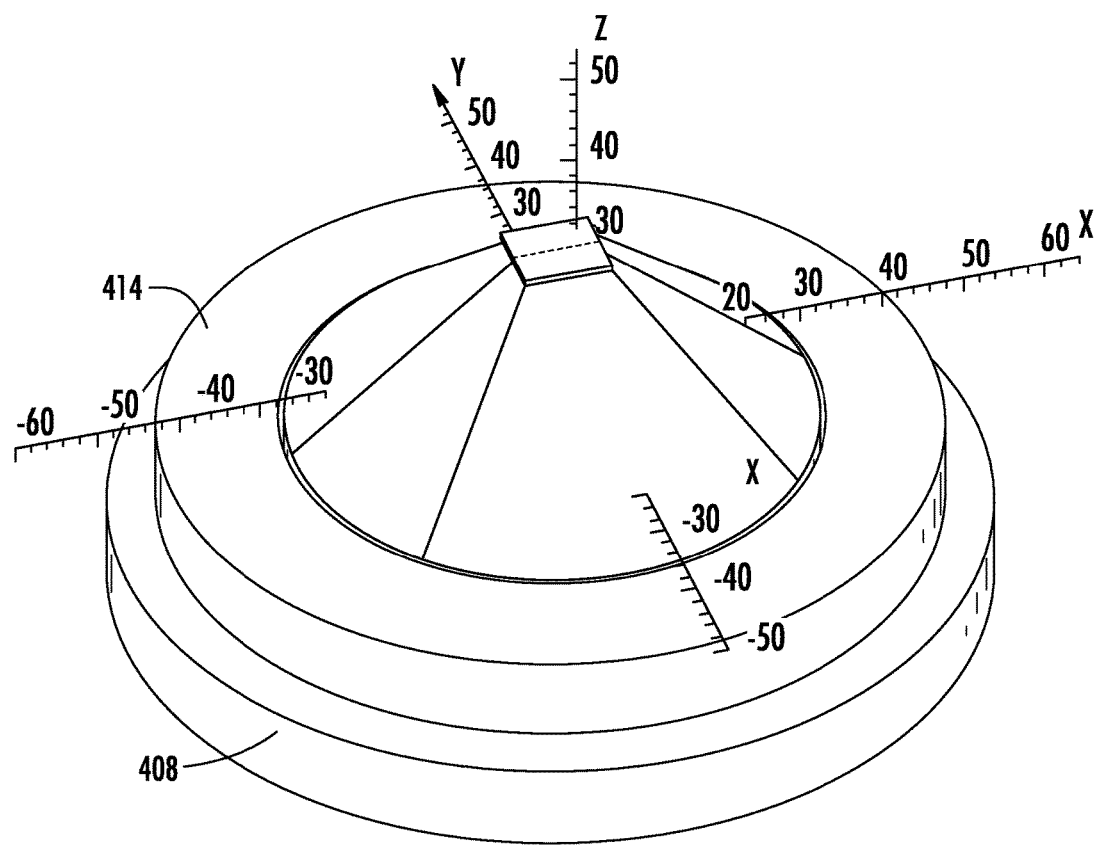
FIGS. 5b and 5c depict a perspective view and side view, respectively, of tow components of the system of FIG. 4a when assembled.
Figure 5C:
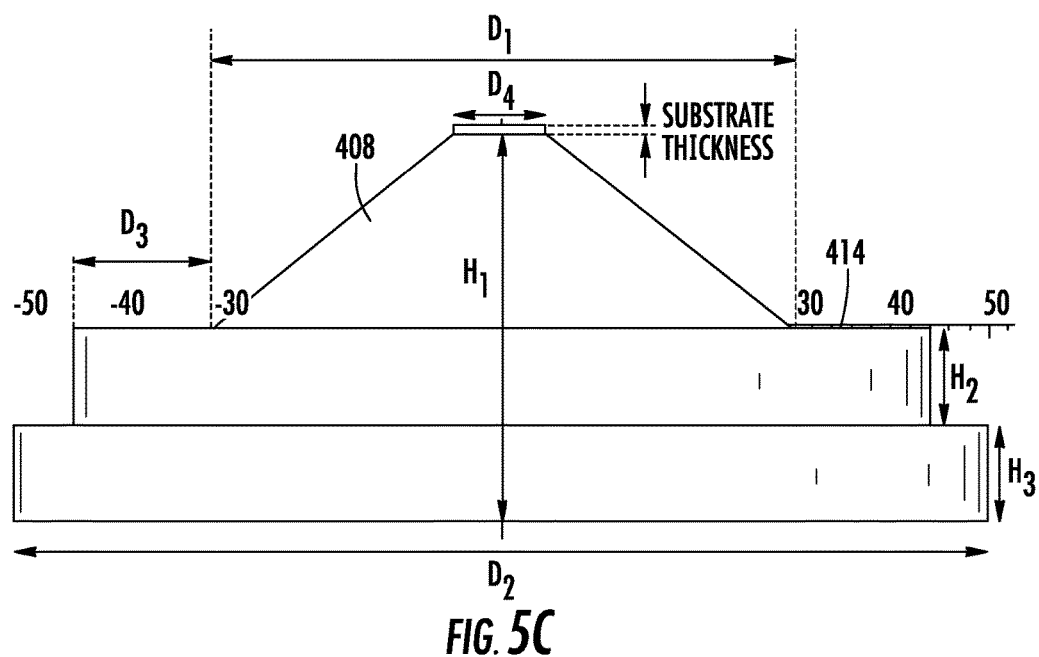

FIG. 5b illustrates an perspective view of the magnetic concentrator 408 when the magnetic coil 414 is mounted on the magnetic concentrator. As illustrated, the magnetic coil 414 rests on the base portion 412 and has an inner diameter that may approximate the outer diameter of the region 411 of the upper portion of the magnetic concentrator 408. FIG. 5c presents a side view of the same assemblage of magnetic concentrator 408 and magnetic coil 414. In one example, the diameter $D_1$ of region 411 is about 60 mm, the height $H_1$ of the magnetic concentrator 408 is about 40 mm, the diameter $D_2$ of the base portion 412 is about 100 mm, the height $H_2$ and $H_3$ are of the magnetic coil are each about 10 mm, the width $D_3$ of the magnetic coil is about 13 mm, and the width $D_3$ of the upper surface 422 is about 10 mm.

Figure 6A:
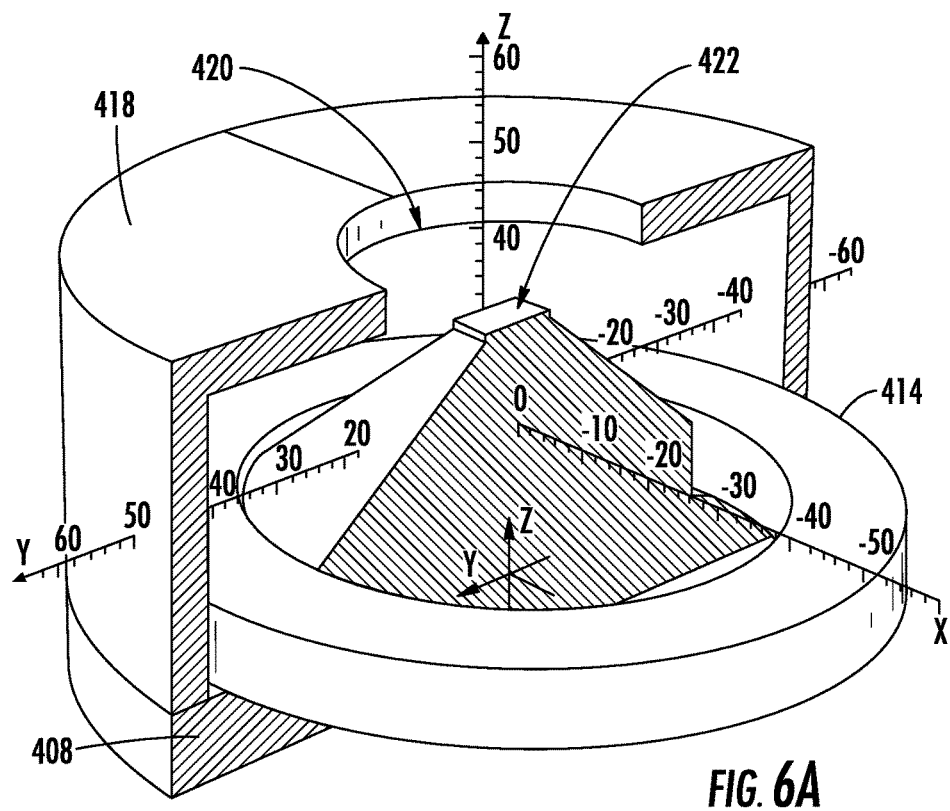
FIG. 6a depicts a perspective view in cutout of a magnetic alignment apparatus of the present embodiments.
Figure 6B:
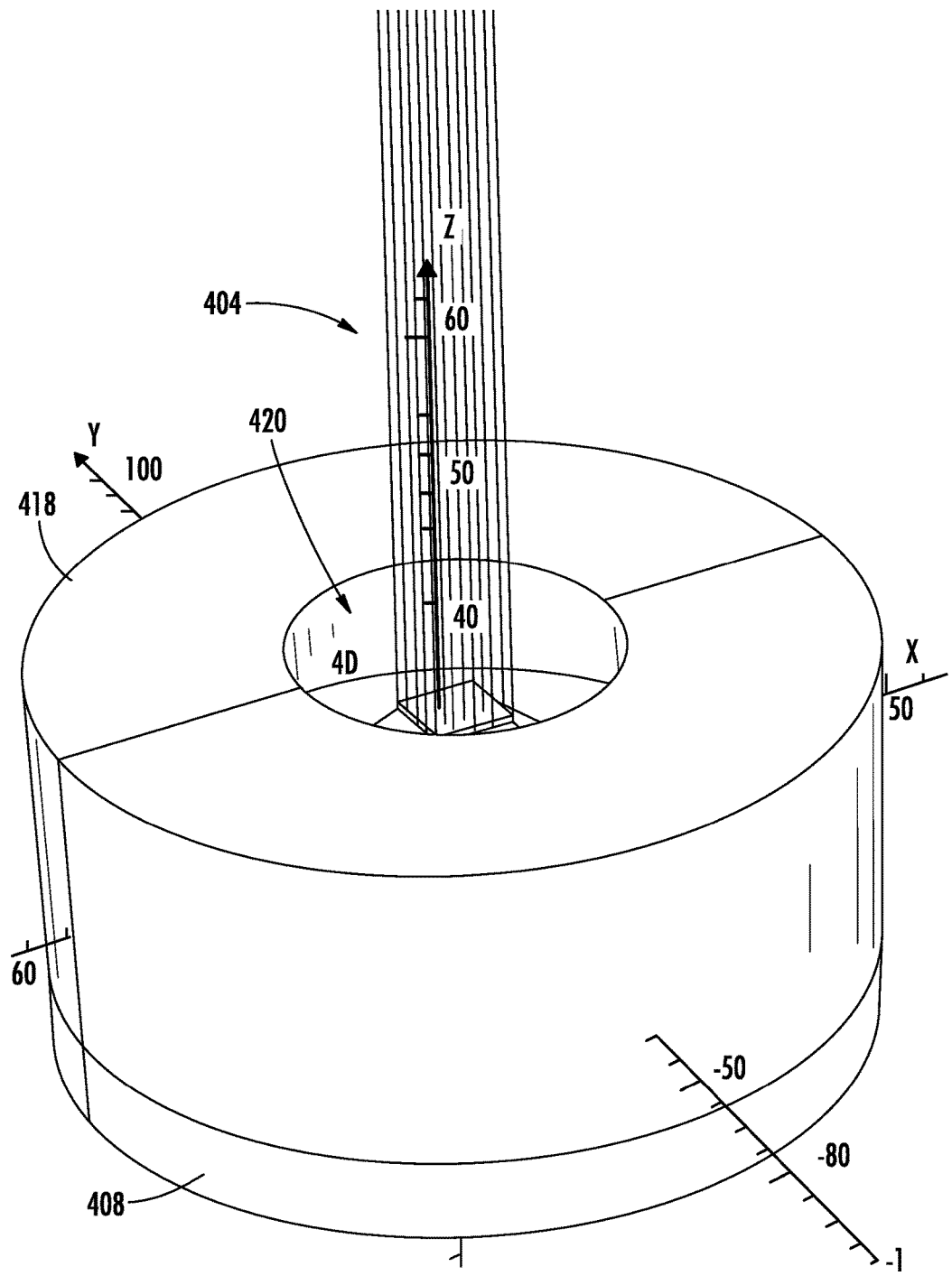
FIG. 6b depicts a perspective view of the apparatus of FIG. 6a without cutout.

FIGS. 6a and 6b depict a perspective view of one variant of the magnetic alignment apparatus 406 including the magnetic concentrator 408, magnetic coil 414, and return yoke 418 when assembled together. FIG. 6a depicts a cutout view showing one half of the magnetic concentrator 408 and return yoke 418 and the full magnetic coil 414. In one example, the outer diameter of the return yoke is about 100 mm to match a similar diameter of the base portion 412. As particularly shown in FIG. 6b, the diameter of the aperture 420 is sufficiently large that an ion beam 404 can strike all portions of the upper surface 422 without obstruction.

In order to further evaluate the effect of a magnetic alignment apparatus on treatment, the characteristics of magnetic fields have been studied for an apparatus arranged according to the exemplary dimensions listed with respect to FIG. 5b. Using the exemplary dimensions for the magnetic alignment apparatus 406 listed above, in one example, when the magnetic coil 414 produces a current density of 10 $A/cm^2$, a magnetic field of about 0.2 Tesla may be produced at a substrate positioned on the upper surface 422. FIGS. 7a-9 illustrate the results of simulations showing the effect of a magnetic alignment component arranged according to the present embodiments on magnetic fields and ions incident on the magnetic alignment apparatus. In the FIG. 7a, a magnetic alignment apparatus 700 is depicted in side view with an x-z coordinate system defined as shown with respect to the magnetic alignment apparatus 700. In particular, the z-direction lies along the perpendicular to the plane of the upper surface 702 of the magnetic alignment apparatus 700, which may represent the location of a substrate. FIG. 7b plots the simulated magnetic field strength along the center line 704 of the magnetic alignment apparatus, which is parallel to the z-direction. Notably, the positional units along the abscissa in FIG. 7b are indicated with reference to the z-axis shown in FIG. 7a. The position of the upper surface 702, for example, is at about 30 mm on the z-axis. Accordingly, it can be seen that the magnetic field strength at the center of the upper surface 702 is about 0.18 Tesla, which represents a magnetic field sufficient to align the easy axis of a magnetic material having the $L1_0$ structure along the z-direction, representing a desirable orientation for perpendicular magnetic storage devices. Thus, an FCT magnetic material disposed on a substrate placed on the upper surface 702 may be effectively oriented with the c-axis of its crystallites aligned perpendicularly to the plane of the substrate.

Figure 7A:
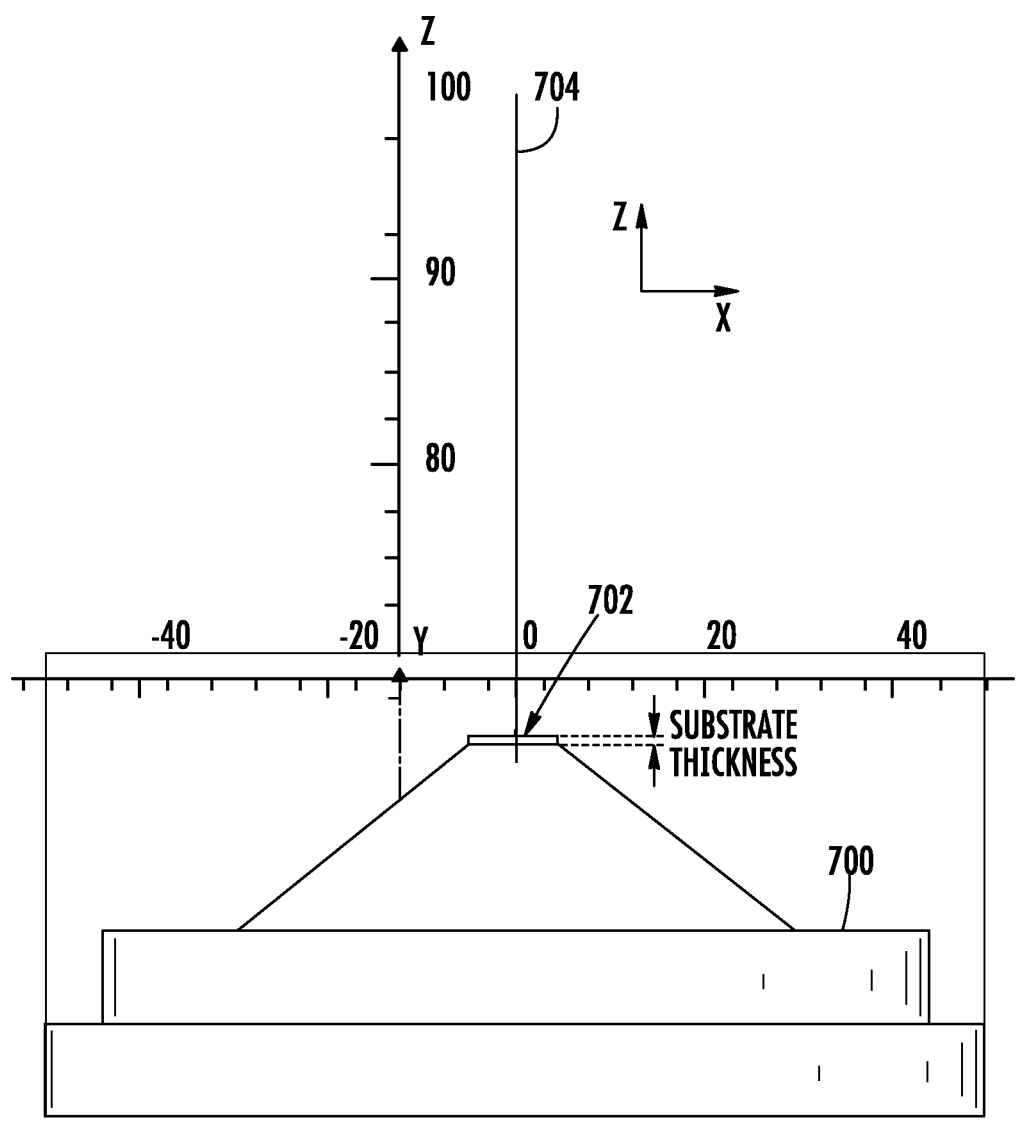
FIG. 7a depicts a side view of an embodiment of a magnetic alignment apparatus together with a coordinate system for simulating magnetic fields.
Figure 7B:
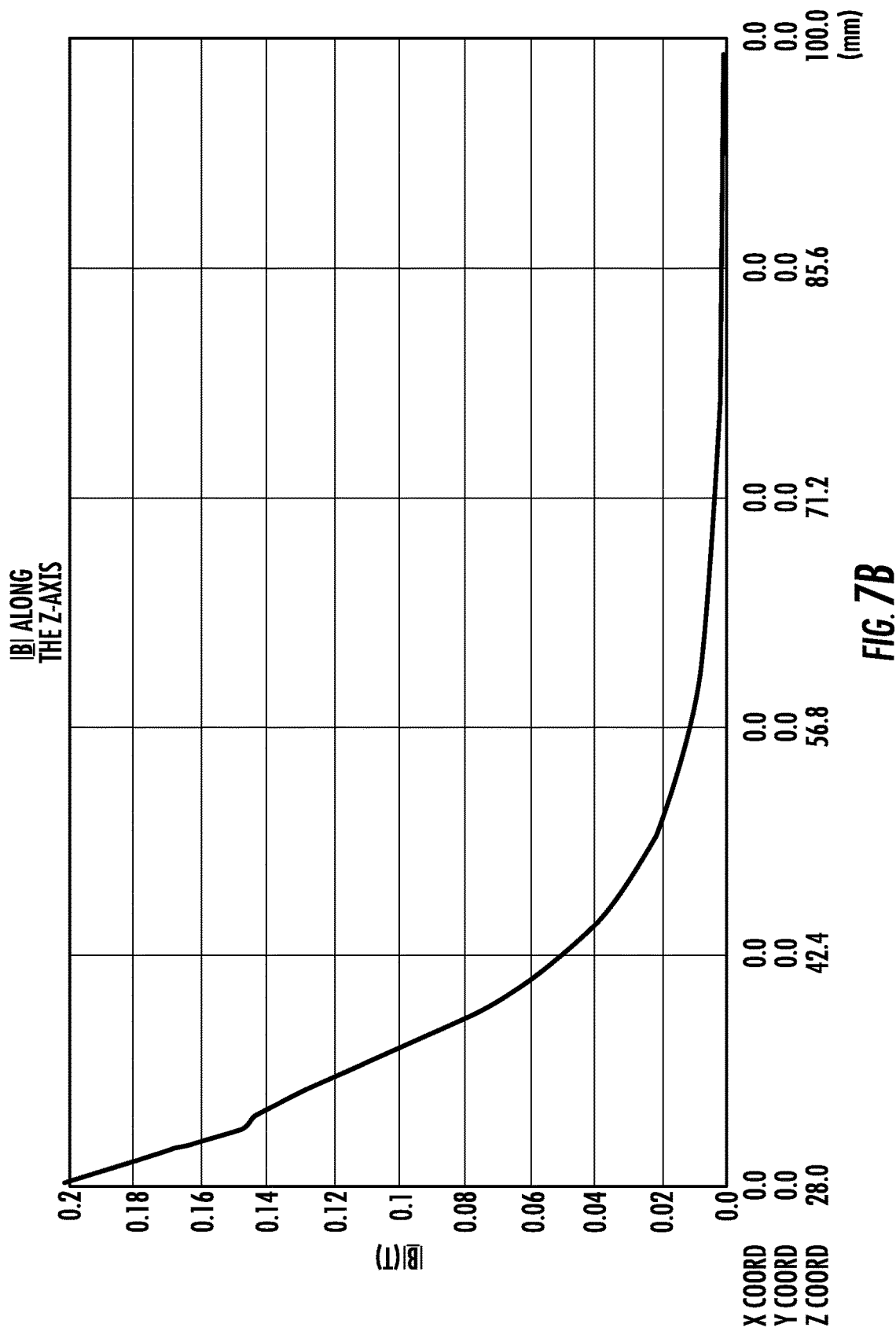
Figure 8A:
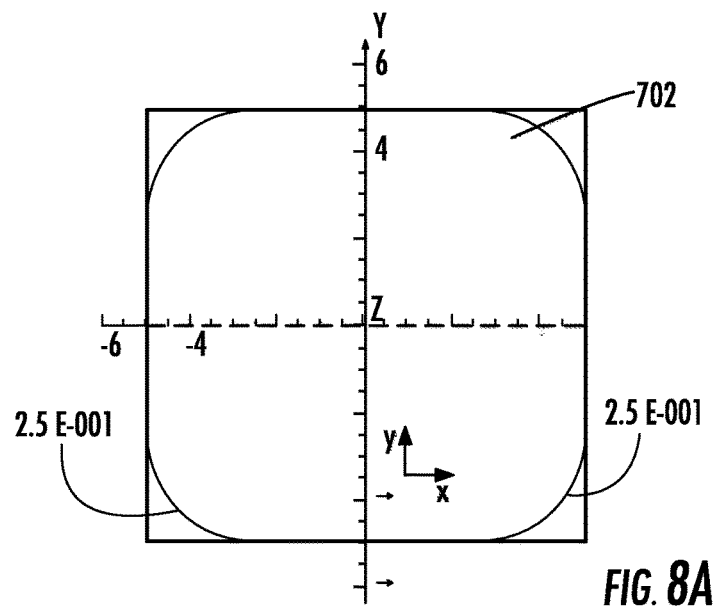
Figure 8B:
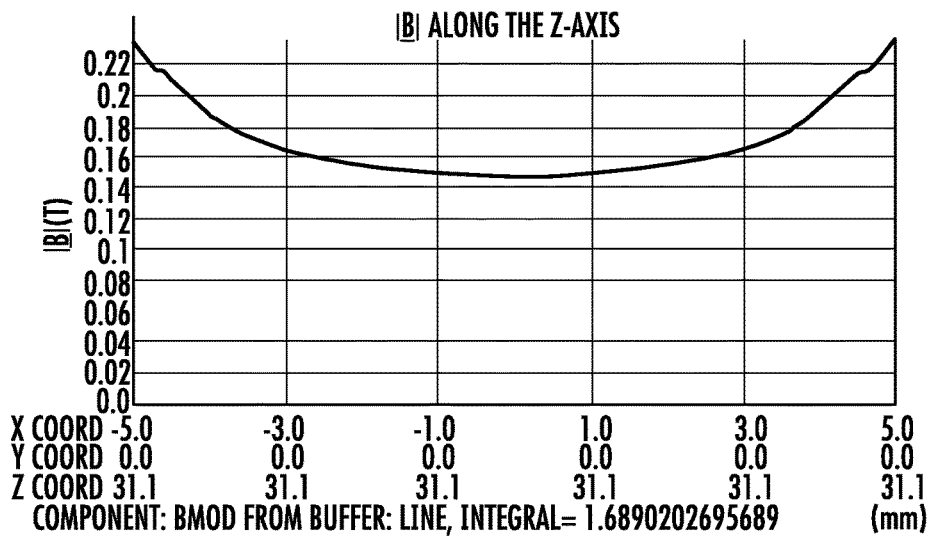

Continuing with the example of FIGS. 7a, 7b, in FIG. 8a, there is shown the simulated magnetic field strength for the same conditions that are represented in FIG. 7b. FIG. 8a plots the magnetic field strength in the x-y plane as shown, which is parallel to the upper surface 702. The z-coordinate is 31.1 mm, which is approximately the position of a thin substrate (<1 mm) when placed on the upper surface 702. Accordingly, the magnetic field strength values shown in FIG. 8a are those experienced by a thin substrate placed upon the upper surface 702. In particular, it may be observed from the uniform shading of FIG. 8a that the magnetic field strength is relatively uniform across a region of approximately 10 mm by 10 mm, which corresponds to the dimensions of the upper surface 702 in the simulation shown in FIG. 8a. FIG. 8b illustrates the simulated magnetic field strength along the x-axis extracted from the two-dimensional magnetic field strength data shown in FIG. 8a. As illustrated, in the central 6 mm region, the magnetic field strength is more uniform, varying by about 10% between the center and the =+/−3 mm positions, with an increase of about 30% toward the edges (between +/−3 mm and +/−5 mm) of the upper surface 702. However, this variation between about 0.15 and 0.22 Tesla may be acceptable for the purposes of aligning crystallites with their c-axes along the z-direction at any position on the upper surface 702. Thus, the magnetic alignment apparatus 700 may produce a magnetic field throughout all regions of a substrate placed on the upper surface 702 that is effective to provide perpendicular alignment of the easy direction of an $L1_0$ phase of a magnetic layer.

Figure 8C:
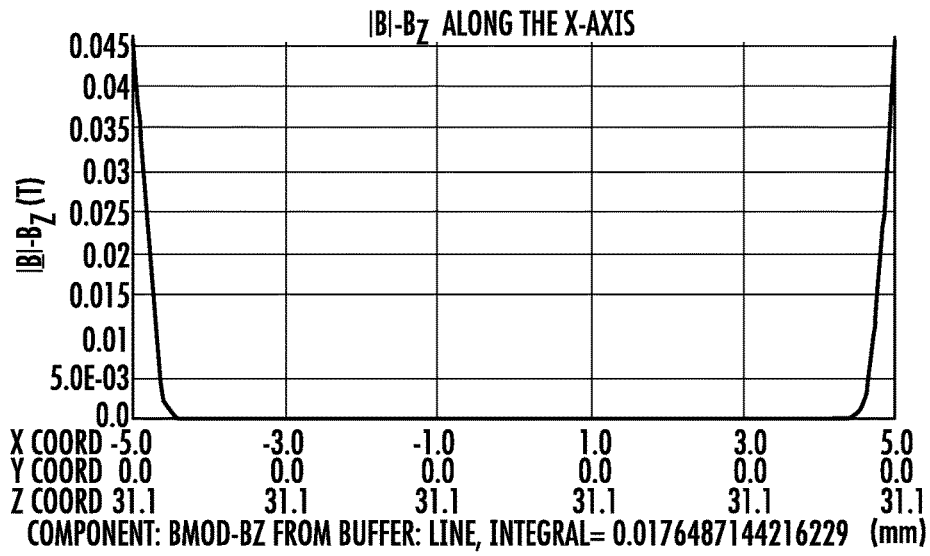

Regarding the directionality of the magnetic field produced by the magnetic alignment apparatus 700, FIG. 8c plots the absolute value of the total magnetic field strength minus the magnetic field strength along the z-direction for the conditions of FIG. 8a. Thus, a zero value denotes a magnetic field completely aligned along the z-axis. As illustrated, the magnetic field is completely aligned along the z-direction for the inner 9 mm of the 10 mm wide upper surface 702. Even at the outer edge (+/−5 mm) only about 20% (0.045 Tesla) of the total magnetic field strength is oriented along directions other than the z-direction. As illustrated in FIG. 8b, this region where a non-z-direction component of the magnetic field is present corresponds to a region in which the total magnetic field increases. Thus, it may be seen that the component of the magnetic field in the z-direction is relatively uniform even on the outside edges when the 0.045 Tesla value of the non-z-direction component of the magnetic field is subtracted. For example, if 0.045 Tesla is subtracted from 0.22 Tesla (representing the total magnetic field strength on the edges of the upper surface at +/−10 mm), the value of the z-component of the magnetic field at the edges (+/5 mm) is about 0.18 Tesla. However, the simulation of FIG. 8c helps to define preferred regions for placing a substrate on upper surface 702. This is because a B field (magnetic field) component oriented along directions other than the z-direction, such as is evident at positions between +/−4.5 and 5 mm, may cause some portions of a layer containing the $L1_0$ phase to orient their easy direction (c-axis) along the non-perpendicular direction of the B-field. Such a layer may consequently present a microstructure contacting a mixture of different orientations for the easy direction with respect to the substrate plane, which is less favorable than a microstructure in which the easy direction is aligned only perpendicular to the substrate plane.

Figure 9:
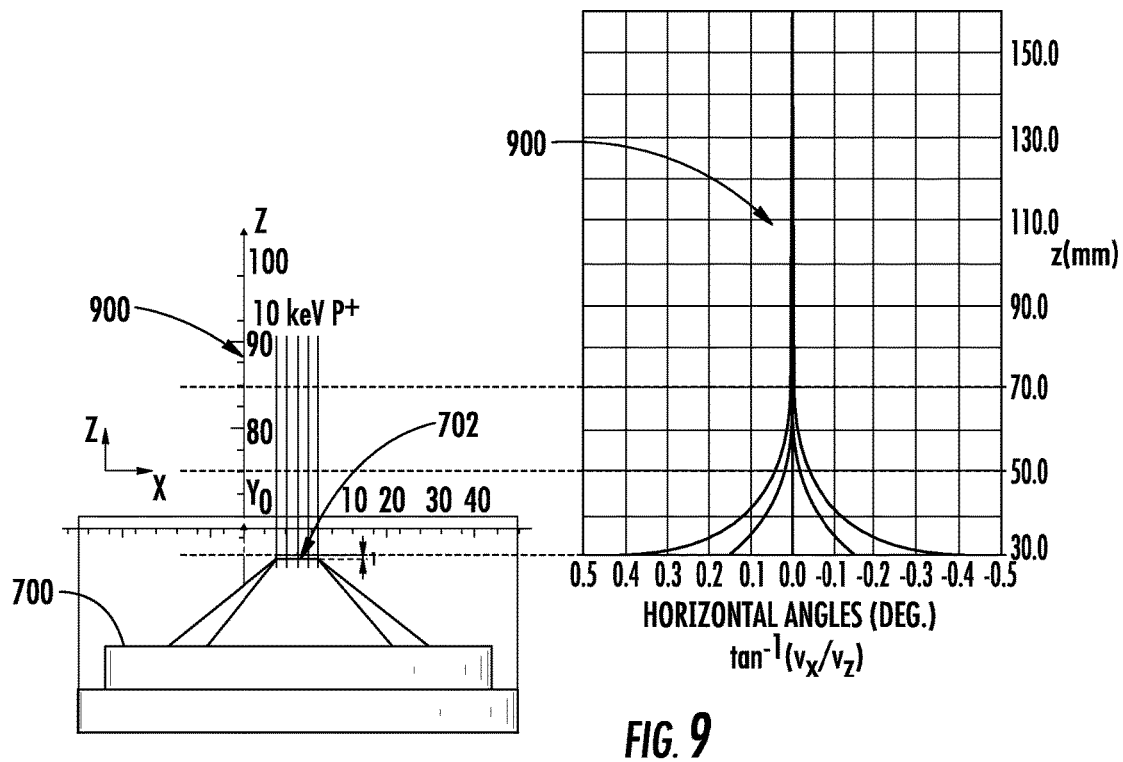

In addition to providing the ability to magnetically align the microstructure of a material such as FCT FePt so that the easy axis is perpendicular to the substrate plane, the apparatus of the present embodiments provides the further advantage that interference is minimized with an incident ion beam used to bring about transformation into the FCT phase. In this regard, FIG. 9 depicts the results of simulation of the effect of the magnetic alignment apparatus 700 on an ion beam 900 incident on the upper surface 702. In the simulation illustrated a parallel set of phosphorous ions is launched along the z-direction at a z-position approximately 170 mm above the upper surface 702. As seen in the graph of FIG. 9, the trajectories of ions only deviate from perpendicular at the upper surface 702 by at most about one half degree. Thus, a substrate held on the upper surface 702 will be subject to ions of uniform trajectories for an ion beam incident at a nominally perpendicular angle.

In sum, the results shown in FIGS. 7a-9 show that the present embodiments provide an apparatus that can generate, as an example, a perpendicular magnetic field of strength in the range of 0.2 Tesla for a 10 $A/cm^2$ electromagnet current, at the position of a substrate that has minimal effect on ion trajectories incident on the substrate. It is to be noted that the above results are merely exemplary and the values of magnetic field achievable by a magnetic alignment apparatus configured according to the present embodiments may vary according to the size of a magnetic concentrator, a magnetic coil, and return yoke, to name a few parameters. Moreover, the physical size of a magnetic alignment apparatus may be scaled upwardly to produce a larger upper surface that can accommodate processing of larger substrate areas than those shown in the examples of FIGS. 7a-9.

Figure 10:
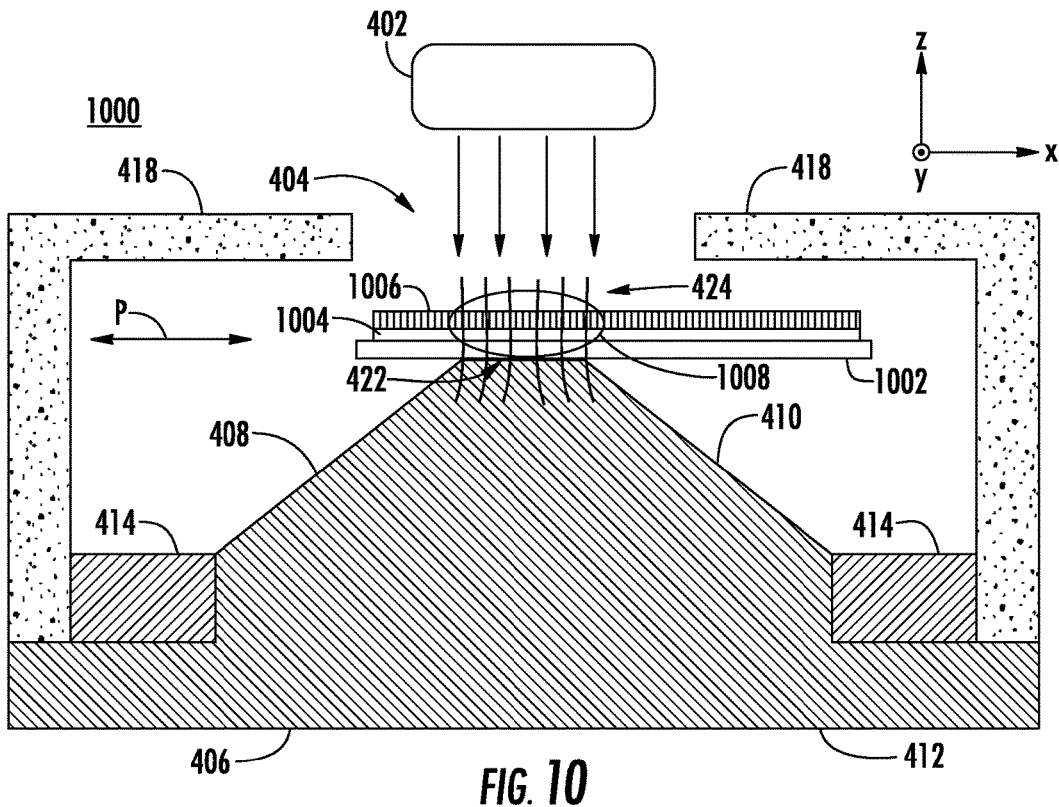
FIG. 10 depicts an exemplary magnetic alignment apparatus.

In additional embodiments, a system for treating a magnetic layer may include a component such as a movable substrate holder that facilitates processing of substrates that are larger than the area of an upper surface of a magnetic alignment apparatus. FIG. 10 depicts one embodiment of a system 1000, which may have similar components to those described above with respect to FIG. 4a, save for the additional movable substrate holder 1002. As illustrated, the movable substrate holder 1002 may accommodate a substrate 1004 and magnetic layer 1006 that have a larger area than the area of the upper surface 422. In one example, the movable substrate holder may be operable to move within the plane P, for example, in both an x- and y-direction as defined by the x-y-z Cartesian coordinate system shown in FIG. 10. In this manner, different sections of the substrate 1004 may be processed in a process zone 1008 at different times by translating the substrate 1004 with respect to the ion beam 404 and ion beam alignment apparatus 406.

Figure 11:
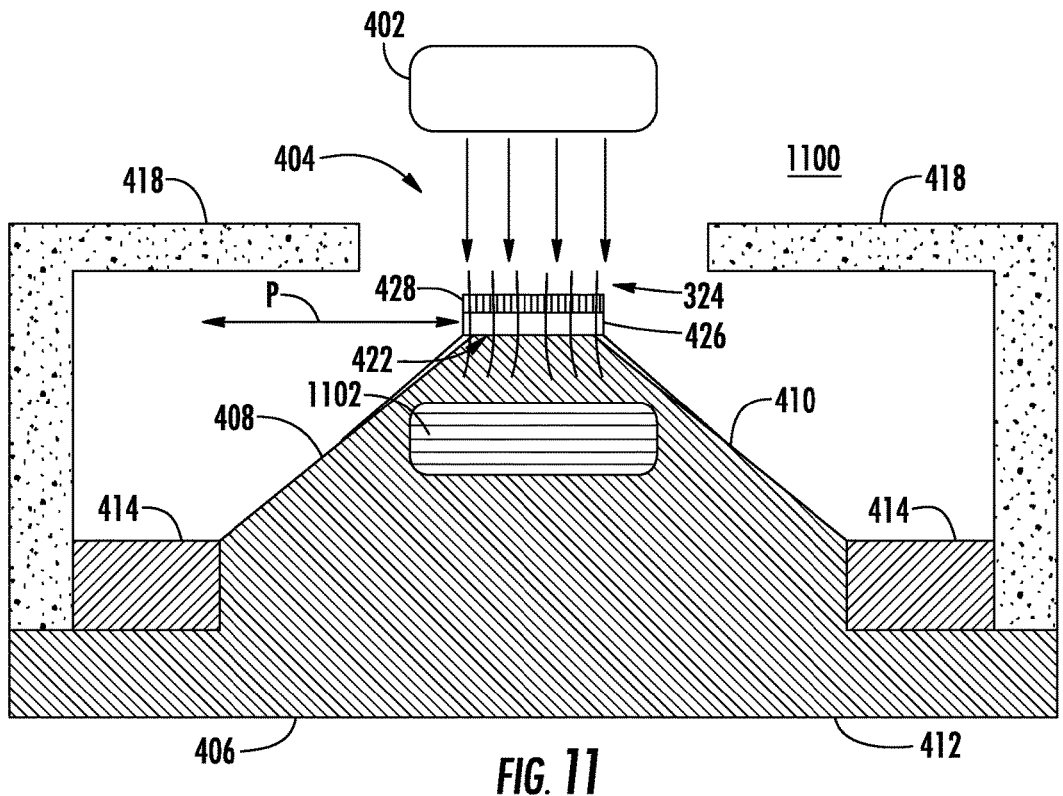
FIG. 11 depicts another exemplary magnetic alignment apparatus.

As evident from the forgoing, and consistent with various embodiments, a highly oriented magnetic layer having a high degree of magnetocrystalline anisotropy may be prepared from a precursor that may be an isotropic and unoriented material, without the need for substrate heating. However, in order to accelerate formation of a desired magnetic layer or to improve the quality of the resulting magnetic layer, substrate heating may be applied concurrently with exposure to ions and a magnetic field. FIG. 11 depicts an embodiment of another system 1100 for treating a magnetic layer. The system 1100 may have similar components to those described above with respect to FIG. 4a, save the heater(s) 1102. As shown in FIG. 11, the heater 1102 is embedded in the magnetic concentrator 408. The heater 1102 may thereby heat the magnetic concentrator 408 including the upper surface 422 and substrate 426 thereon.

Figure 12:
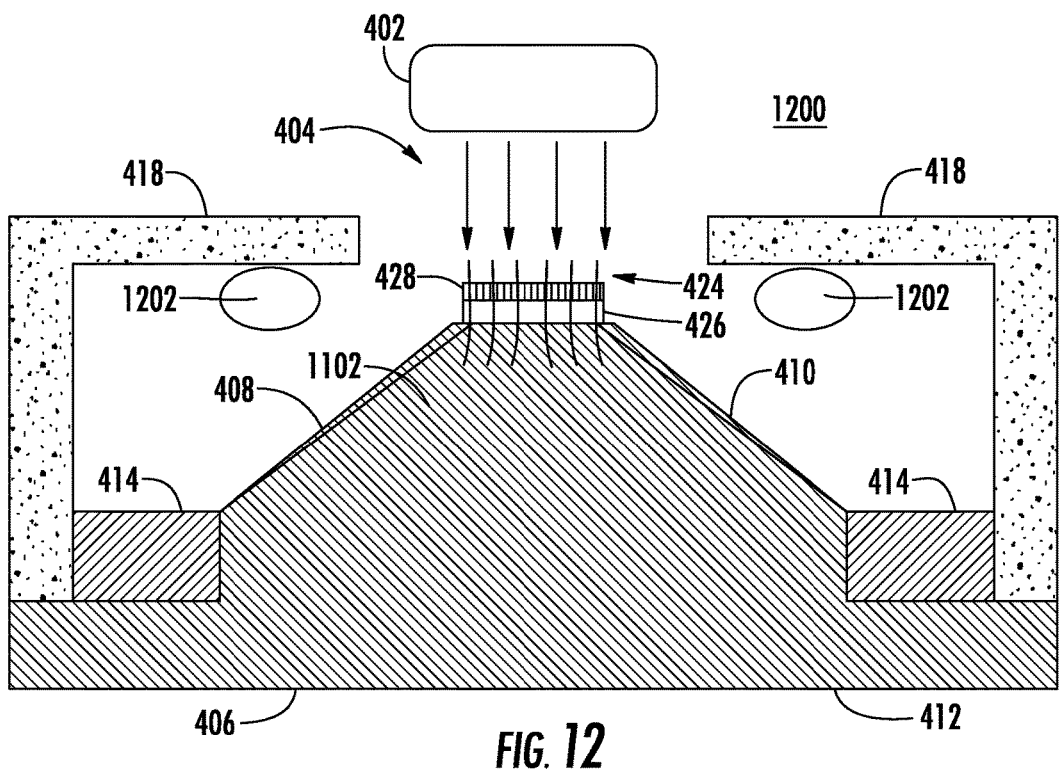
FIG. 12 depicts still another exemplary magnetic alignment apparatus.

FIG. 12 presents another embodiment of a system 1200 for treating a magnetic layer. The system 1200 may have similar components to those described above with respect to FIG. 4a, save the heating lamps 1202. As shown in FIG. 12, the heating lamps, which may be connected to the return yoke 418, may directly heat a substrate 426 by radiation, as well as indirectly by heating the magnetic concentrator 408.

The embodiments of FIGS. 11 and 12, may, for example provide substrate heating to temperatures up to 300 C. When a substrate 426 is placed into the system 1200 in one instance, the layer 428 may be an FePt material having the FCC structure. In one example of treatment, the FePt material is heated to 300 C while exposed to the ion beam 404 in the presence of the magnetic field 424. The FePt material thereby transforms into the $L1_0$ FCT phase having small crystallites that are have a high degree of alignment wherein the c-axes are oriented perpendicularly to the plane of the substrate 426.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. In particular, embodiments detailed above have generally been described with respect to apparatus for generating ion beams that have conventional beamline components. However, in other embodiments apparatus such as plasma doping (PLAD) apparatus may be used to provide ions to a magnetic alignment apparatus.

Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system for treating a magnetic layer disposed on a substrate, comprising:
   an ion source for generating an ion beam containing ions of desired species; and
   a magnetic alignment apparatus disposed downstream of the ion source and proximate to the substrate, the magnetic alignment apparatus generating a magnetic field to the magnetic layer along a direction out of plane relative to the magnetic layer during exposure to the ion beam, wherein the magnetic alignment apparatus comprises a magnetic concentrator having a tapered shape comprising a base portion and an upper portion that defines an upper surface having a smaller surface area than the base portion, the upper surface configured to support a substrate containing the magnetic layer and to intercept an ion beam incident thereon.

2. The system of claim 1, further comprising:
   a coil disposed around a lower portion of the magnetic concentrator wherein the lower portion is disposed adjacent the base portion; and
   a return yoke disposed around at least the upper portion of the magnetic concentrator, the return yoke having an aperture configured to accept the ion beam.

3. The system of claim 2 wherein the magnetic concentrator comprises a steel material.

4. The system of claim 2 wherein the coil comprises one of a permanent magnet and an electromagnet.

5. The system of claim 2 wherein the return yoke is configured to enclose the coil.

6. The system of claim 2 further comprising a heater configured to heat the substrate.

7. The system of claim 6 wherein the heater is embedded in the magnetic concentrator.

8. The system of claim 1 wherein the ion beam comprises inert gas ions.

9. The system of claim 1 wherein a magnetic field strength of the magnetic field is about 0.1 Tesla or greater.

10. The system of claim 1 further comprising a movable substrate holder operative to move the substrate in a plane perpendicular to the magnetic field.

11. The system of claim 1 the magnetic alignment apparatus comprising a set of components to generate a translation motion, a tilt motion, and/or a rotational motion with respect to the ion beam.

12. The system of claim 1 further comprising a set of ion implantation components to direct the ions along a direction of the magnetic field applied at the magnetic layer.

* * * * *